Figures 1, 2:
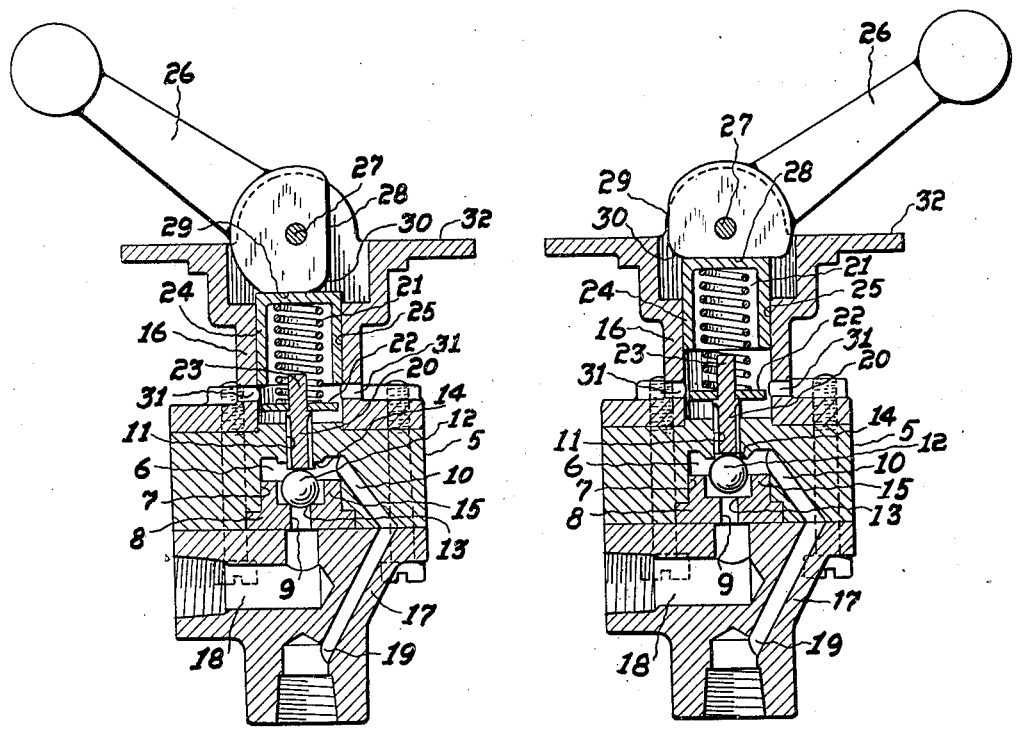

Oct. 11, 1949.  J. LE VALLEY  2,484,628
VALVE
Filed June 23, 1945

INVENTOR
John LeValley
BY
HIS ATTORNEY.

Patented Oct. 11, 1949

2,484,628

UNITED STATES PATENT OFFICE 2,484,628

VALVE

John Le Valley, Painted Post, N. Y., assignor to Ingersoll-Rand Company, New York, N. Y., a corporation of New Jersey Application June 23, 1945, Serial No. 601,230

2 Claims. (Cl. 251—118)

This invention relates to valves and more particularly to that type of valve which is manually operable to control the flow of fluid from a source to a passageway and the venting of the passageway when the source is cut off.

One object of the invention is to provide a valve having two operating positions which is non-leaking in both such positions.

Another object of the invention is to provide a valve in which the opening and closing is rapid so as to prevent wastage of the fluid.

Other objects and advantages will become apparent from the following description.

In the drawing in which similar reference characters refer to similar parts,

Figure 1 is a vertical section through a valve constructed in accordance with the practice of the invention and, Figure 2 is a vertical section through a valve showing the valve element in a position to permit flow of fluid from the source to a suitable outlet.

The valve is provided with a hollow body member 5 having a valve chamber 6 formed by a bore 7 adapted to receive a seating plug 8. Communicating with the valve chamber 6 are an inlet passage 9 in the plug 8, an outlet 10, and a venting passage 11.

Preferably the inlet passage 9 and the venting passage 11 are in alignment with each other and are controlled by a ball valve 12 which is adapted to seal the passages at a seat 13 at the chamber end of the passage 9 and at the seat 14 at the chamber end of the venting passage 11. Thus the flow of fluid to or from the outlet passage 10 depends upon whether the valve 12 rests on the seat 13 or upon the seat 14, respectively.

In order to guide the valve 12 to the seats the plug 8 is provided with a sleeve portion 15 extending above the seat 13 which limits the sidewise motion of the ball 12.

The body 5 is preferably mounted on a base 16 and is also provided with a connecting part 17 having an inlet aperture 18 suitably threaded for connection to a pipe (not shown) and communicating with the inlet passage 9. There is also provided an outlet aperture 19 also suitably threaded for pipe connection and communicating with outlet passage 10 in the body 5.

Valve 12 is controlled by an actuating member in this instance a stem 20 extending through the venting passage 11 to contact the valve and at the other end extending into the hollow interior of the base 16. Force to actuate the stem 20 is transmitted through a spring 21.

The spring 21 rests at one end upon a washer 22 encircling the reduced end 23 of the stem 20, and at the other end rests in the bottom of an inverted cup-shaped guide 24 adapted to slide axially in the bore 25 of the base 16. The guide 24 is adapted to be actuated by a lever 26 rotatably mounted on the base 16 at a pivot 27 and is provided with a cam surface consisting of two flat faces 28 and 29 disposed angularly with respect to each other, in this instance at about 90°, and tangentially with respect to a short curved portion 30 that serves to connect said faces. The flat part 28 is disposed at a relatively short normal distance from the center of rotation 27 while the other flat portion 29 is relatively remote. Thus when the lever 26 is in the position inclined to the left as in Figure 1 the flat face 29 of the cam is in a position depressing the guide 24 and, through the compression of spring 21, depresses the stem 20 to force the valve 12 to its seat 13, thereby closing the inlet passage 9. When the lever 26 is thrown to the right hand position as in Figure 2 the flat 28 of the cam then bears against the upper face of the guide 24 relieving the pressure of the spring 21 against the stem 20 and permitting the fluid pressure from the inlet passage 9 to push the valve 12 against the seat 14 thereby closing the vent passage 11. Suitable apertures 31 are provided in the base 16 to permit escape of pressure fluid from the interior of the base to atmosphere.

It will be noted that inasmuch as the radius of the cam at the curved connecting face 30 of the cam is less than at any other part of the cam face the arrangement acts somewhat like a snap switch to automatically accelerate the motion of the lever 26 from one position to the other thereby avoiding waste of pressure fluid.

This valve is particularly designed to be mounted upon a suitable panel and for this purpose the base 16 is provided with a flange 32 for attachment thereto in any suitable manner.

I claim:

1. A valve comprising a valve chamber having inlet, outlet and venting passages, a pair of opposed seats at the inlet and venting passages respectively, a ball valve in said chamber adapted to be moved alternatively from one to the other of said seats to close the corresponding passages, a valve actuating member extending through one of said seats, a guide member, spring means between said guide member and actuating member to transmit force to said actuating member, and a pivotally mounted manually operable member having a cam portion to actuate said guide member, the cam being provided with two flat faces arranged angularly with respect to each other for selective engagement with the guide member to retain the lever in positions corresponding to the seated positions of the valve.

2. A valve comprising a valve chamber having inlet, outlet, and venting passages, a pair of opposed seats at the inlet and venting passages respectively, a valve in the chamber adapted to be moved alternatively from one to the other of said seats to close the corresponding passages, a valve actuating stem extending through the venting passage and the corresponding seat, a guide member in alignment with said stem and movable coaxially therewith, a spring interposed between said guide member and said stem to transmit force to move said stem, a pivotally mounted manually operable lever having a cam to actuate said guide member, a curved portion on said cam, and two flat faces on said cam arranged substantially perpendicular with respect to each other and tangentially with respect to said curved portion for selective engagement with the guide member to retain the lever in positions corresponding to the seated positions of the valve.

JOHN LE VALLEY.

REFERENCES CITED

The following references are of record in the file of this patent:

UNITED STATES PATENTS

| Number | Name | Date |
|---|---|---|
| 618,792 | Flockhart | Jan. 31, 1899 |
| 1,071,271 | Spangler | Aug. 26, 1913 |
| 1,721,349 | Mitton | July 16, 1929 |
| 2,054,909 | Morehouse | Sept. 22, 1936 |
| 2,310,435 | Jenkins | Feb. 9, 1943 |

FOREIGN PATENTS

| Number | Country | Date |
|---|---|---|
| 351,325 | Italy | Aug. 9, 1937 |